US012578431B2

(12) United States Patent
Kang et al.

(10) Patent No.: US 12,578,431 B2
(45) Date of Patent: Mar. 17, 2026

(54) SYSTEM AND METHOD OF GENERATING TARGET INFORMATION FOR A MULTI-RADAR TARGET SIMULATOR

(71) Applicant: HYUNDAI AUTOEVER CORP., Seoul (KR)

(72) Inventors: Hyun Ah Kang, Seoul (KR); Jae Hoon Lim, Namyangju-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 1150 days.

(21) Appl. No.: 17/533,940

(22) Filed: Nov. 23, 2021

(65) Prior Publication Data

US 2022/0187442 A1     Jun. 16, 2022

(30) Foreign Application Priority Data

Dec. 16, 2020     (KR) ......................... 10-2020-0176521

(51) Int. Cl.
*G01S 7/40*          (2006.01)
*G01S 13/00*          (2006.01)
G01S 13/931          (2020.01)

(52) U.S. Cl.
CPC .......... *G01S 7/4052* (2013.01); *G01S 13/006* (2013.01); *G01S 7/4086* (2021.05); *G01S 13/931* (2013.01)

(58) Field of Classification Search
CPC .......... G01S 7/40–4095; G01S 13/931; G01S 13/006
See application file for complete search history.

(56) References Cited

U.S. PATENT DOCUMENTS 3,783,172 A * 1/1974 Bernstein ................. G09B 9/54
                                                                434/2
4,070,769 A * 1/1978 Hollis ...................... G09B 9/40
                                                                434/2
(Continued)

FOREIGN PATENT DOCUMENTS

CN          106707254 A      5/2017
CN          111896923 A      11/2020
(Continued)

OTHER PUBLICATIONS

Office Action cited in Chinese patent application No. 202111442011.1; Aug. 17, 2024; 14 pp.

(Continued)

*Primary Examiner* — Matthew M Barker
(74) *Attorney, Agent, or Firm* — Lempia Summerfield Katz LLC

(57)          ABSTRACT

A system for generating target information for a multi-radar target simulator includes: a modelling unit configured to generate a plurality of objects so as to be located within a plurality of radar detection ranges of a front radar sensor; an object arranging unit configured to arrange the plurality of objects located in each of the plurality of radar detection ranges in a distance order and select at least two objects among the plurality of arranged objects based on an order close to the front radar sensor and the same travelling direction; and a simulator control unit configured to select at least two objects as targets from the at least two objects selected by the object arranging unit as targets and control a multi-radar target simulator by using information about said at least two selected targets.

8 Claims, 8 Drawing Sheets

(56) References Cited

U.S. PATENT DOCUMENTS

| | | | | |
|---|---|---|---|---|
| 5,457,463 A * | 10/1995 | Vencel | ..................... | G09B 9/54 |
| | | | | 342/170 |
| 5,518,400 A * | 5/1996 | Otoide | .................. | G01S 7/4052 |
| | | | | 434/4 |
| 6,301,552 B1 * | 10/2001 | Gomez | .................. | G01S 7/4052 |
| | | | | 703/2 |
| 9,575,161 B1 | 2/2017 | Haghighi et al. | | |
| 10,520,586 B2 | 12/2019 | Haghighi et al. | | |
| 10,527,715 B2 | 1/2020 | Ahmed et al. | | |
| 10,578,715 B2 | 3/2020 | Haghighi et al. | | |
| 11,143,745 B2 | 10/2021 | Ahmed et al. | | |
| 2006/0267832 A1 * | 11/2006 | Newberg | .............. | G01S 7/4052 |
| | | | | 342/195 |
| 2017/0115378 A1 | 4/2017 | Haghighi et al. | | |
| 2017/0227627 A1 | 8/2017 | Chanda et al. | | |
| 2017/0307732 A1 | 10/2017 | Haghighi et al. | | |
| 2017/0363719 A1 | 12/2017 | Ahmed et al. | | |
| 2020/0103497 A1 | 4/2020 | Ahmed et al. | | |
| 2020/0184027 A1 * | 6/2020 | Dolan | .................. | G01S 13/931 |
| 2020/0300968 A1 * | 9/2020 | Gruber | .................. | G01S 7/4052 |
| 2020/0319325 A1 * | 10/2020 | Kong | .................... | G01S 7/4021 |
| 2021/0055382 A1 * | 2/2021 | Kong | .................... | G01S 7/4052 |
| 2021/0055383 A1 * | 2/2021 | Lee | ........................ | G01S 13/325 |
| 2021/0055384 A1 * | 2/2021 | Lee | ........................ | G01S 13/931 |
| 2021/0405153 A1 * | 12/2021 | Lee | ........................ | G01S 7/4008 |

FOREIGN PATENT DOCUMENTS

| | | |
|---|---|---|
| JP | 2017227616 A | 12/2017 |
| KR | 101808494 B1 | 12/2017 |
| KR | 20190135716 A | 12/2019 |
| KR | 102116136 B1 | 5/2020 |

OTHER PUBLICATIONS

Office Action cited in corresponding Korean patent application No. 10-2020-0176521; Feb. 23, 2023; 10 pp.

Zhen Ding et al.; Benefits of Target Prioritization for Phased Array Radar Resource Management; The 18th International Radar Symposium IRS 2017, Jun. 28-30, 2017; 7 pp.

* cited by examiner

LONG-RANGE RADAR
DETECTION RANGE

Ob7

Ob3

Ob6

Ob4

Ob5

Ob2

Ob1

SHORT-RANGE RADAR
DETECTION RANGE

SYSTEM AND METHOD OF GENERATING TARGET INFORMATION FOR A MULTI-RADAR TARGET SIMULATOR

CROSS-REFERENCE TO RELATED APPLICATIONS

This application claims priority to and the benefit of Korean Patent Application No. 10-2020-0176521, filed on Dec. 16, 2020, the entire contents of which are incorporated herein by reference.

TECHNICAL FIELD

The present disclosure relates to a system and a method of generating target information for a multi-radar target simulator.

BACKGROUND ART

Recently, a lot of vehicle control systems for controlling a vehicle by using a radar sensor for detecting an object in the vicinity have been developed. In order for the vehicle control system to accurately control a vehicle, accurate object detection by the radar sensor is essential.

In order to test performance of the radar sensor, a target simulator for generating a virtual target is used. When the target simulator receives a radar signal from the radar sensor, the target simulator may simulate a virtual target with a reflected waveform considering a Doppler effect and the like. The radar sensor receives the reflected waveform of the virtual target. Then, the radar sensor determines whether the target is detected and determines a position of the target, a distance to the target, and the like according to the received reflected waveform. The performance test of the radar sensor may be performed by comparing the actual position, distance, and the like of the virtual target with the result determined by the radar sensor.

The types of target simulator used in the performance test of the radar sensor include a single radar target simulator capable of simulating a single target and a multi-radar target simulator capable of simulating a multi-target.

The single radar target simulator is capable of simulating only a single target, so that there is a limit in performance evaluation for a complicated function of SCC-CUT IN/OUT of an Advanced Driver Assistance System (ADAS) that is one of the vehicle control systems.

In the case of the multi-radar target simulator, there is a limit to the number of targets that can be simulated in a lab environment, and the number of targets that can be simulated varies according to the performance of the multi-radar target simulator. Further, the multi-radar target simulator may generate a test scenario by considering target information, such as a determined target position and the number of targets.

In the multi-radar target simulator, even though the target information used for simulating the target is a lot, there is a limit to the number of targets that can be simulated due to the limitation of the performance of the multi-radar target simulator.

The multi-radar target simulator has several limitations that when it is desired to simulate more targets, the multi-radar target simulator cannot simulate a random target and can simulate a moving target only in a determined section.

When the performance of the multi-radar target simulator is updated and thus the number of targets that can be simulated increases, there is a cumbersome problem of having to modify a test scenario according to the changed performance Accordingly, the multi-radar target simulator has a problem that the degree of freedom is low to implement a complex test environment, such as random traffic.

SUMMARY

The present disclosure has been made in an effort to provide a system and a method of generating target information for a multi-radar target simulator, which enable a multi-radar target simulator to implement a test environment. The test environment may include, for example, random traffic without considering the number of targets and a position of the target by selecting only target information that may affect the performance evaluation of various vehicle control systems.

An embodiment of the present disclosure provides a system for generating target information for a multi-radar target simulator. The system includes a modelling unit configured to generate a plurality of objects so as to be located within a plurality of radar detection ranges of a front radar sensor. The system also includes an object arranging unit configured to arrange the plurality of objects located in each of the plurality of radar detection ranges in a distance order and select at least two objects among the plurality of arranged objects based on an order close to the front radar sensor. The system also includes a simulator control unit configured to select at least two objects as targets from the at least two objects selected by the object arranging unit and control a multi-radar target simulator by using information about said at least two selected targets.

The plurality of radar detection ranges may include a short-range radar detection range and a long-range radar detection range.

The object arranging unit may select the at least two objects among the plurality of arranged objects by further considering whether a travelling direction of the plurality of objects is the same as a travelling direction of a vehicle mounted with the front radar sensor.

The object arranging unit may arrange the plurality of objects located in the short-range radar detection range in an order of distance and select at least two objects among the arranged objects based on an order close to the front radar sensor.

The object arranging unit may arrange the plurality of objects located in the long-range radar detection range in the order of distance and select at least two objects among the arranged objects based on an order close to the front radar sensor.

The object arranging unit may combine the selected objects in the short-range radar detection range or the long-range radar detection range and re-arrange the combined objects in the order of distance.

When there are overlapping objects among the re-arranged objects, the object arranging unit may remove any one among the overlapping objects.

The object arranging unit may select at least two objects among the re-arranged objects based on the order close to the front radar sensor.

The simulator control unit may assign target information at a location closest to the front radar sensor among the at least two target information to a first simulator control signal and assign the remaining target information to a second simulator control signal.

The simulator control unit may compare previous target information and current target information of each target respectively assigned to the first simulator control signal and the second simulator control signal. When a position of the current target information crosses as a result of the comparison, the simulator control unit may assign the current target information to the first simulator control signal and each of the second simulator control signal identically to the previous target information.

Another embodiment of the present disclosure provides a method of generating target information for a multi-radar target simulator. The method includes generating an object, by a modelling unit, a plurality of objects so as to be located within a plurality of radar detection ranges of a front radar sensor. The method also includes arranging, by an object arranging unit, the plurality of objects located in each of the plurality of radar detection ranges in a distance order. The method also includes selecting an object, by the object arranging unit, at least two objects among the plurality of arranged objects based on an order close to the front radar sensor. The method also includes when the object selected in the object selecting operation is selected as a target, generating, by the object arranging unit, target information about the selected target.

The arranging may include arranging, by the object arranging unit, a plurality of objects located in a short-range radar detection range among the plurality of radar detection ranges in an order close to the front radar sensor. The arranging may also include arranging, by the object arranging unit, a plurality of objects located in a long-range radar detection range among the plurality of radar detection ranges in an order close to the front radar sensor. The arranging the plurality of objects located in the short-range radar detection range and the arranging the plurality of objects located in the long-range radar detection range may further include a travelling direction determining operation of determining whether a travelling direction of the plurality of objects is the same as a travelling direction of a vehicle mounted with the front radar sensor.

The selecting may include selecting at least two objects among the plurality of objects arranged in the short-range radar detection range based on an order close to the front radar sensor. The selecting may also include selecting at least two objects among the plurality of objects arranged in the long-range radar detection range based on an order close to the front radar sensor.

The method may further include combining, by the object arranging unit, the objects selected in the first object selecting operation and the second object selecting operation.

The method may further include re-arranging, by the object arranging unit, the objects combined in the combining operation in the order close to the front radar sensor.

The re-arranging may include, when there are overlapping objects in the re-arranged objects, removing, by the object arranging unit, any one from the overlapping objects.

The target information generating may include selecting, by the object arranging unit, at least two objects among the plurality of re-arranged objects as targets in the order close to the front radar sensor and assigning target information about the selected target to a simulator control signal. The target information generating may also include comparing, by a simulator control unit, target information previously assigned to the simulator control signal and currently selected target information and determining whether the target information previously assigned to the simulator control signal crosses the currently selected target information. The target information generating may also include when it is determined that the target information previously assigned to the simulator control signal crosses the currently selected target information in the crossing determining operation, cross-arranging, by the simulator control unit, the current target information to the simulator control signal. The target information generating may also include a transmitting operation of transmitting, by the simulator control unit, the simulator control signal to which the current target information is cross-assigned or is assigned in order to the multi-radar target simulator.

According to the system and the method of generating target information for the multi-radar target simulator according to the embodiments of the present disclosure, it is possible for the multi-radar target simulator to implement a test environment of a random traffic, and the like without considering the number of targets and the position of the target by selecting only target information that may affect a performance evaluation of various vehicle control system.

The system and the method of generating target information for the multi-radar target simulator according to the embodiments of the present disclosure are applicable to various target simulators. When the system and the method of generating target information for the multi-radar target simulator according to the embodiments of the present disclosure are applied to the different target simulator, it is possible to build an evaluation environment having the high degree of freedom by applying the same test scenario.

The foregoing summary is illustrative only and is not intended to be in any way limiting. In addition to the illustrative aspects, embodiments, and features described above, further aspects, embodiments, and features should become apparent by reference to the drawings and the following detailed description.

BRIEF DESCRIPTION OF THE DRAWINGS

In order that the disclosure may be well understood, there will now be described various forms thereof, given by way of example, reference being made to the accompanying drawings, in which.

Figure 1:
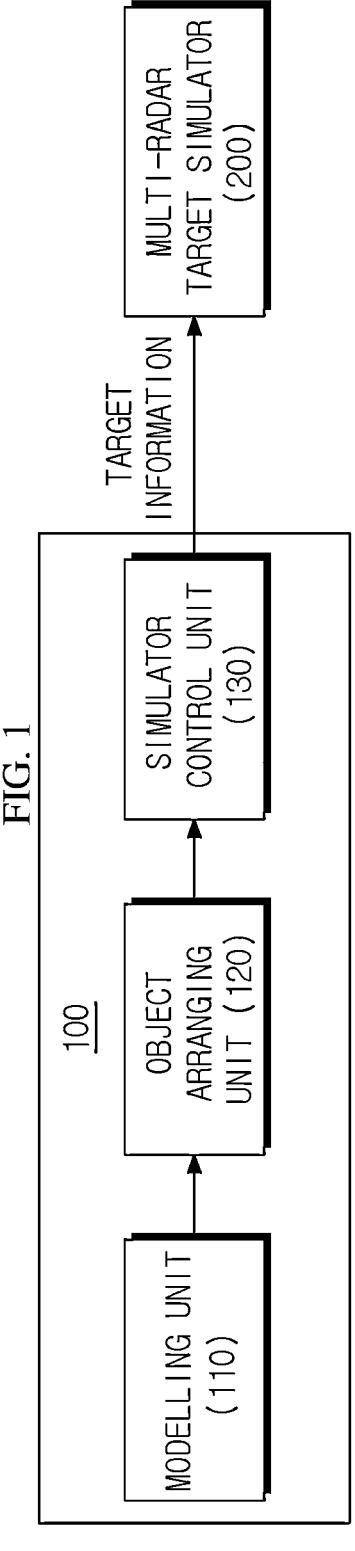
FIG. 1 is a block diagram of a system for generating target information for a multi-radar target simulator according to an embodiment of the present disclosure.

The drawings described herein are for illustration purposes only and are not intended to limit the scope of the present disclosure in any way.

It should be understood that the appended drawings are not necessarily to scale and may present a somewhat simplified representation of various features illustrating the basic principles of the present disclosure. The specific design features of the present disclosure as disclosed herein, including, for example, specific dimensions, orientations, locations, and shapes, may be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. First of all, it should be noted that in giving reference numerals to elements of each drawing, like reference numerals refer to like elements even though like elements are shown in different drawings. It should be understood that although the embodiment of the present disclosure is described hereafter, the spirit of the present disclosure is not limited thereto and the present disclosure may be changed and modified in various ways by those having ordinary skill in the art.

FIG. 1 is a block diagram of a system for generating target information for a multi-radar target simulator according to an embodiment of the present disclosure.

Referring to FIG. 1, a system 100 for generating target information for a multi-radar target simulator according to an embodiment of the present disclosure may generate target information used in simulating a target of a multi-radar target simulator 200. Herein, the target information may include information about target arranged in an order close to a front radar sensor so as to affect performance evaluation of various vehicle control systems.

When the target information is input, the multi-radar target simulator 200 may output a reflected wave by simulating a multi-radar target. A radar sensor (not illustrated) of the vehicle detects the reflected wave output by the multi-radar target simulator 200, so that detection performance of the multi-radar target may be evaluated. Accordingly, there is an effect that it is possible to evaluate performance for a complex function of the vehicle control system (not illustrated), such as an ADAS, using the radar sensor.

The system 100 for generating target information may include a modelling unit 110, an object arranging unit 120, and a simulator control unit 130.

The modelling unit 110 may virtually generate a plurality of objects so as to be located within a plurality of radar detection ranges. Herein, the plurality of objects may be a vehicle of which a position and a speed vary according to a time flow. The plurality of radar detection ranges may be set based on the front radar sensor including a short-range radar sensor having a short-range radar detection range and a long-range radar sensor having a long-range radar detection range. The front radar sensor is installed in a front portion of the vehicle and may be a target for the function evaluation by the multi-radar target simulator 200.

The modelling unit 110 may arbitrarily set a distance to each of the plurality of objects, a direction of each object, and a relative speed of each object based on the front radar sensor.

The object arranging unit 120 may arrange the plurality of objects positioned within each of a plurality of radar detection ranges in order of distance. The object arranging unit 120 may arrange the plurality of objects positioned within the short-range radar detection range in order from near-distance to far-distance. Further, the object arranging unit 120 may arrange the plurality of objects positioned within the long-range radar detection range in order from near-distance to far-distance.

The object arranging unit 120 may determine whether the plurality of arranged objects has the same travelling direction as that of the vehicle in which the front radar sensor is mounted. When the plurality of objects is located on the same lane as that of the vehicle mounted with the front radar sensor and is located within a predetermined angle within the front radar detection range, the object arranging unit 120 may determine that the plurality of arranged objects has the same travelling direction as that of the vehicle in which the front radar sensor is mounted. The object arranging unit 120 may exclude another object having a different travelling direction.

The object arranging unit 120 may select at least two objects among the plurality of objects arranged for the plurality of radar detection ranges based on an order close to the front radar sensor. The process of selecting the object by the object arranging unit 120 is described in detail with reference to FIGS. 2-4.

The simulator control unit 130 may select at least two objects as targets from the at least two objects selected by the object arranging unit 120. The simulator control unit 130 may assign target information about the selected target to a simulator control signal. The simulator control unit 130 may transmit the simulator control signal to the multi-radar target simulator 200. Herein, the multi-radar target simulator 200 may simulate the multi-radar target by outputting a reflected signal according to the received simulator control signal.

Hereinafter, the process of selecting at least two objects among the plurality of objects as the targets is described with reference to FIGS. 2-4.

Figure 2:
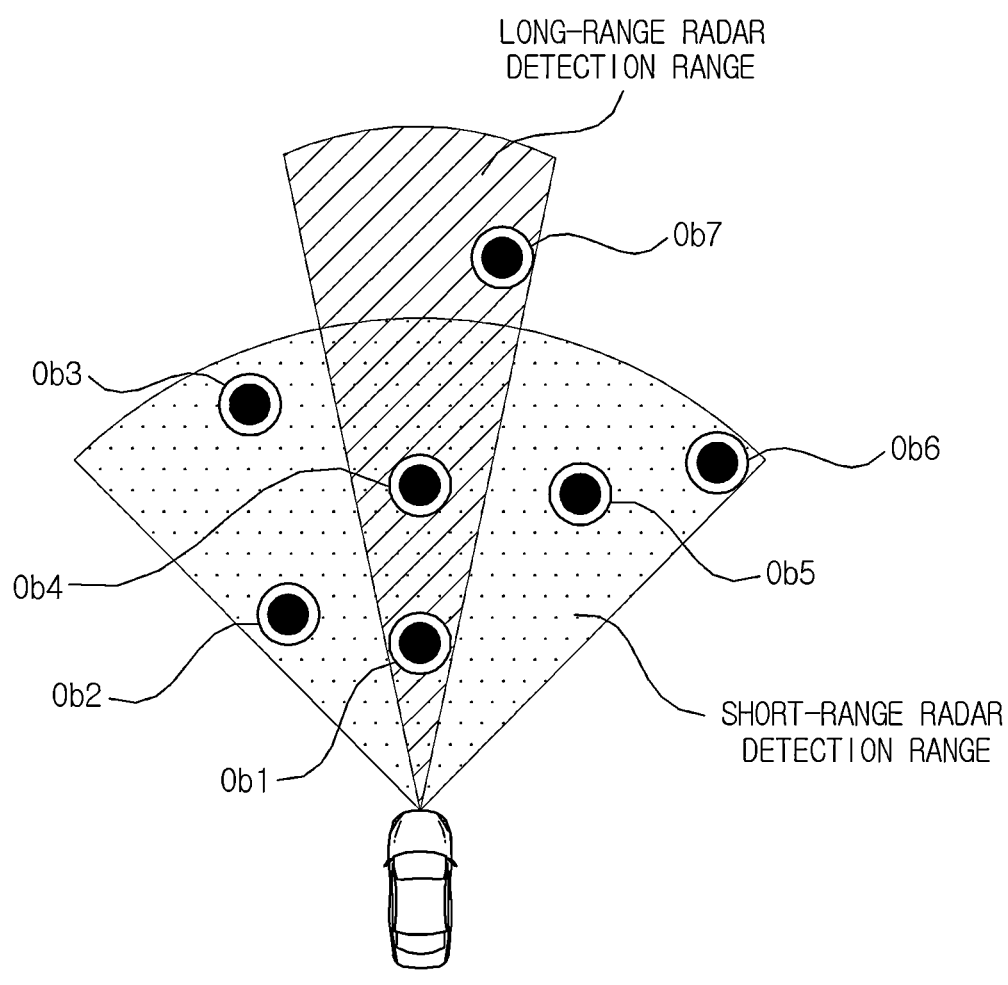
FIG. 2 is a diagram illustrating an object generated by a modelling unit of FIG. 1.

FIG. 2 is a diagram illustrating an object generated by the modelling unit of FIG. 1.

Referring to FIG. 2, the modelling unit 110 may arbitrarily generate the plurality of objects Ob1, Ob2, Ob3, Ob4, Ob5, Ob6, and Ob7 so as to be located within the short-range radar detection range or the long-range radar detection range. Herein, the modelling unit 110 may receive short-range radar detection range information and the long-range radar detection range information from the front radar sensor that is the target of the function evaluation. The modelling unit 110 may arbitrarily set a distance, a direction, a relative speed, and the like for each of the plurality of objects Ob1, Ob2, Ob3, Ob4, Ob5, Ob6, and Ob7.

Figure 3:
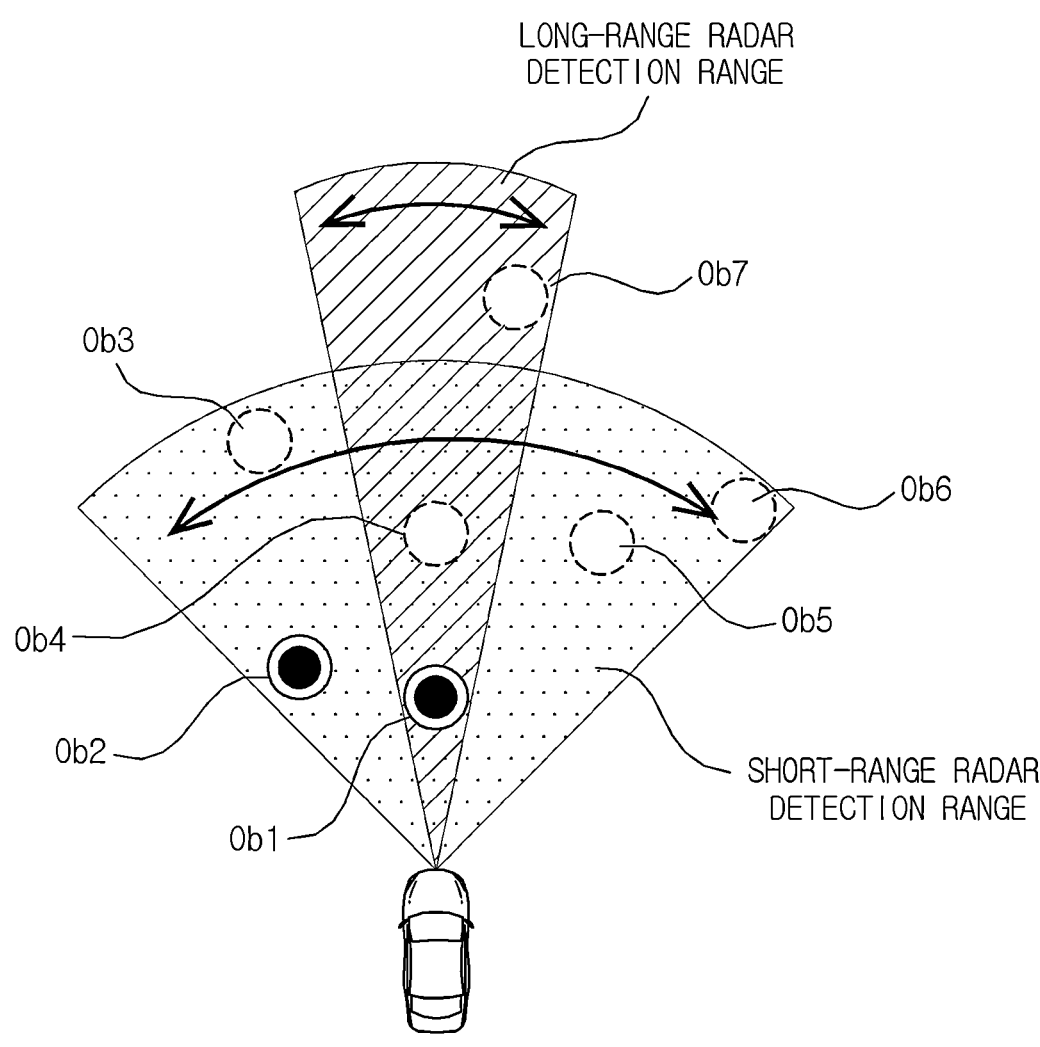
FIG. 3 is a diagram for describing a process of selecting an object by an object arranging unit of FIG. 1.

FIG. 3 is a diagram for describing a process of selecting an object by the object arranging unit of FIG. 1.

Referring to FIG. 3, the object arranging unit 120 may arrange the plurality of objects positioned in each of the plurality of radar detection ranges in order of a distance.

In the embodiment, the object arranging unit 120 may arrange the first object Ob1, the second object Ob2, the third object Ob3, the fourth object Ob4, the fifth object Ob5, and the sixth object Ob6 located in the short-range radar detection range in an order close to the vehicle or front radar sensor. The arrenged order of the objects within the short-range radar detection range may be represented in Table 1 below.

TABLE 1

| Short-range radar detection range | |
|---|---|
| Closest | Ob1 |
| . . . | Ob2 |
| | Ob4 |
| | Ob5 |
| | Ob3 |
| Farthest | Ob6 |

7

The object arranging unit 120 may select at least two objects among the plurality of objects located within the short-range radar detection range in the order of the closest distance. Herein, the first object Ob1 and the second object Ob2 may be selected.

Further, the object arranging unit 120 may arrange the first object Ob1, the fourth object Ob4, and the seventh object Ob7 located within the long-range radar detection range in the order close to the vehicle or front radar sensor. The arranged order of the objects within the long-range radar detection range may be represented in Table 2 below.

TABLE 2

| Long-range radar detection range | |
| --- | --- |
| Closest | Ob1 |
| . . . | Ob4 |
| Farthest | Ob7 |

The object arranging unit 120 may select at least two objects among the objects located within the long-range radar detection range in the order of the closest distance. Herein, the first object Ob1 and the fourth object Ob4 may be selected.

The object arranging unit 120 may combine the plurality of objects selected for each of the plurality of radar detection ranges. The object arranging unit 120 may rearrange the combined objects in the order close to the vehicle or the front radar sensor when the objects are combined. The re-arranged order of the combined objects may be represented in Table 3 below.

TABLE 3

| | Short-range radar detection range | Long-range radar detection range |
| --- | --- | --- |
| Closest | Ob1 | Ob1 |
| . . . | Ob2 | |
| Farthest | | Ob4 |

When there are overlapping objects among the combined objects, the object arranging unit 120 may remove any one among the overlapping objects. The object arranging unit 120 may remove the overlapping first object Ob1 based on Table 3.

The object arranging unit 120 may select at least two objects located at the closest distance from among the combined objects. Based on Table 3, the first object Ob1 and the second object Ob2 may be selected.

Figure 4:
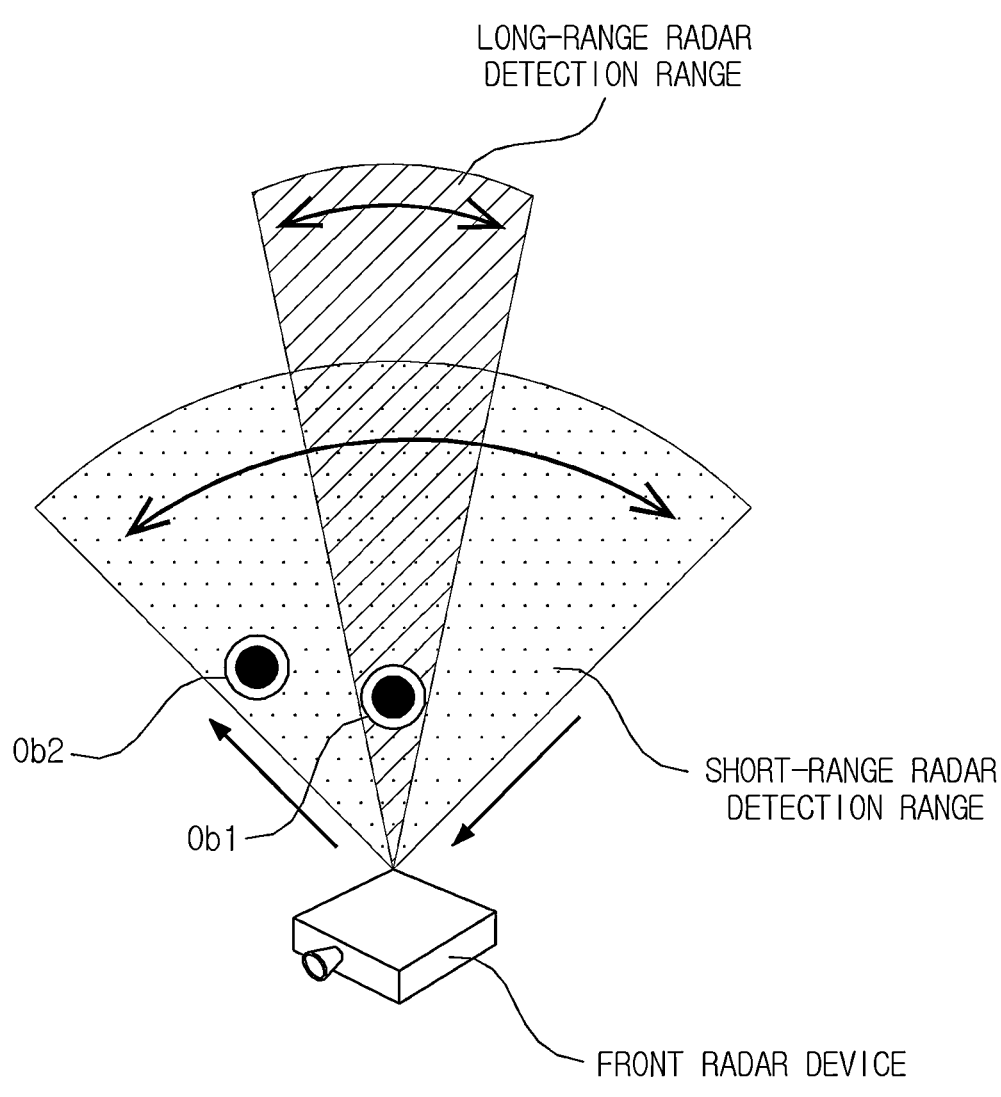
FIG. 4 is a diagram illustrating an object selected by the object arranging unit of FIG. 1.

FIG. 4 is a diagram illustrating an object selected by the object arranging unit of FIG. 1.

Referring to FIG. 4, the first object Ob1 and the second object Ob2 selected by the object arranging unit 120 may be checked. The first object Ob1 and the second object Ob2 may be selected as a target simulated by the multi-radar target simulator 200.

Figure 5:
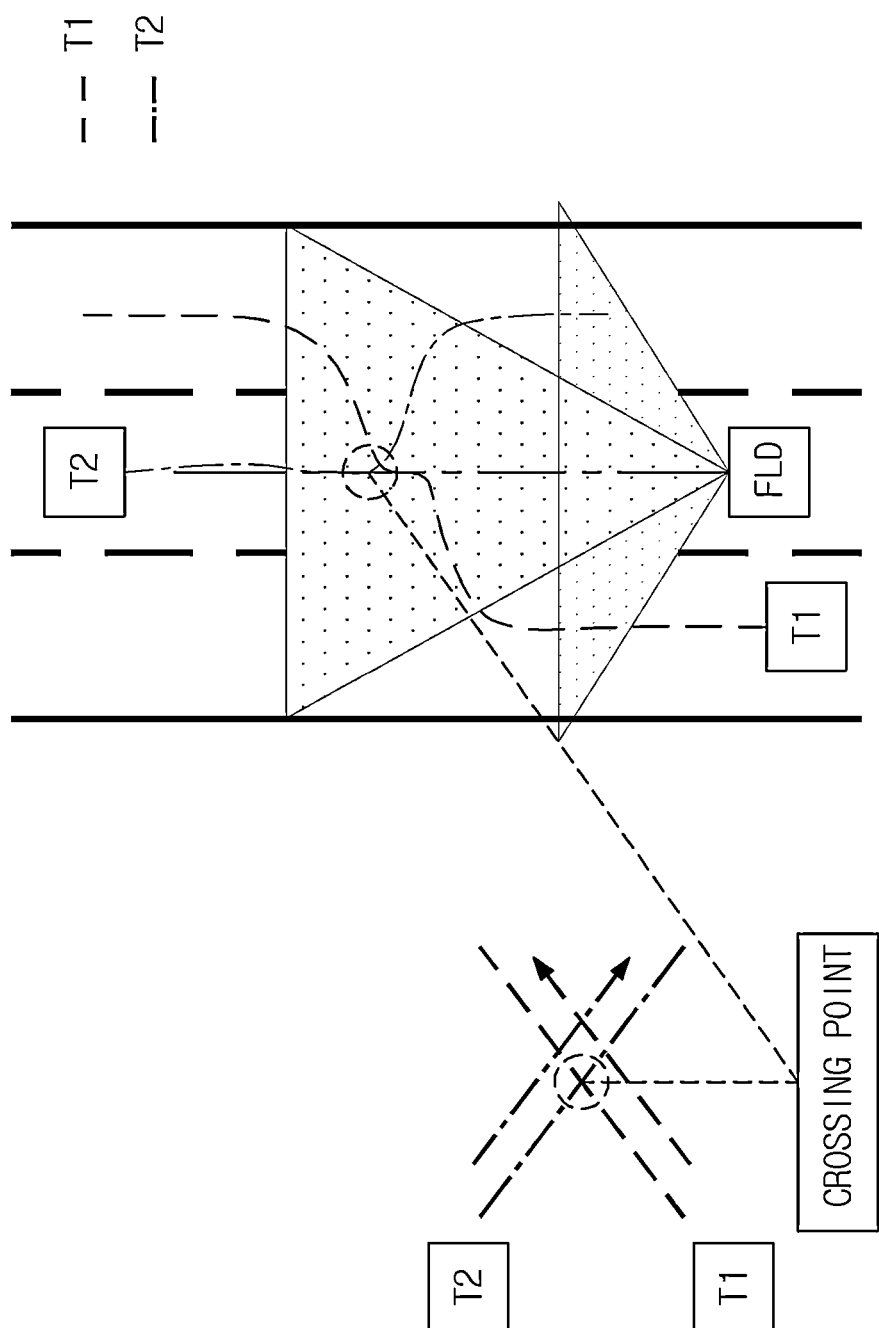
FIG. 5 is a diagram for describing a process of generating target information by using the selected object in FIG. 4.
Figure 6:
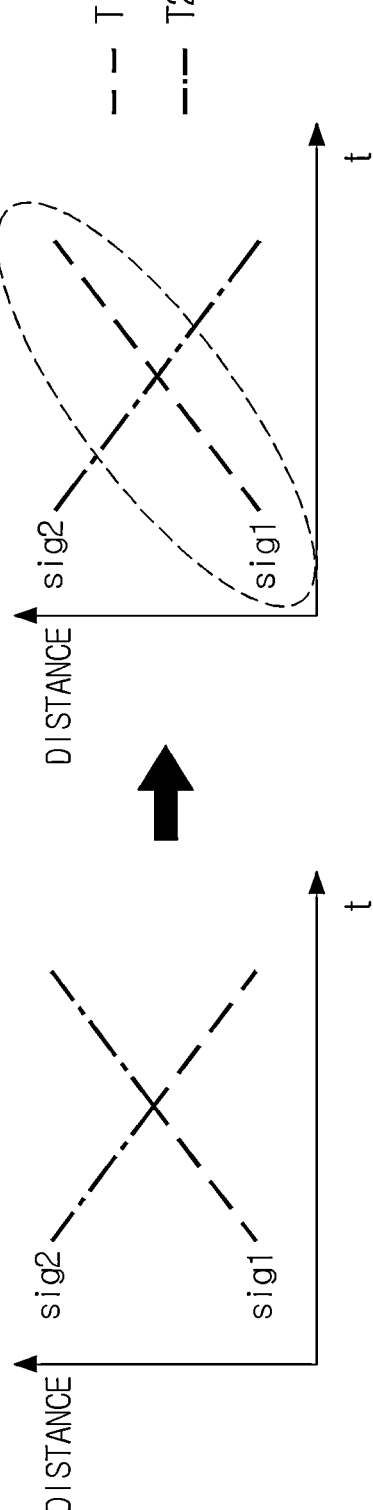
FIG. 6 is a diagram illustrating a signal assignment of target information crossing over time in FIG. 5.

FIG. 5 is a diagram for describing a process of generating target information by using the selected object in FIG. 4. FIG. 6 is a diagram illustrating a signal assignment of target information position-crossing over time in FIG. 5.

Referring to FIGS. 5 and 6, the simulator control unit 130 may select, from the objects selected by the object arranging unit 120, at least one object finally as the target that is to be simulated by the multi-radar target simulator 200.

In the embodiment, the simulator control unit 130 may select the first object Ob1 closest to the front radar sensor FLD as a first target T1 and select the second object Ob2 as a second target T2.

In the embodiment, the simulator control unit 130 may assign target information about the first target T1 to a first simulator control signal sig1 and assign target information about the second target T2 to a second simulator control signal sig2. Herein, the signal assignment may be performed in the unit of 1 ms.

In the embodiment, when the simulator control unit 130 assigns new target information according to a time flow, the simulator control unit 130 may compare previous target information and current target information assigned to each of the first simulator control signal sig1 and the second simulator control signal sig2.

When the position of the current target information crosses as a result of the comparison, the simulator control unit 130 may assign the current target information to each of the first simulator control signal sig1 and the second simulator control signal sig2 identically to the previous target information.

In other words, when the location of the second target T2 is changed to be closer to the front radar sensor FLD than the first target T1, the target information of the second target T2 is not assigned to the first simulator control signal sig1 but may be identically or maintained to be assigned to the second simulator control signal sig2 as before.

The simulator control unit 130 may transmit the first simulator control signal sig1 and the second simulator control signal sig2 to which the target information is assigned to the multi-radar target simulator 200.

The multi-radar target simulator 200 may simulate the multi-radar target according to the first simulator control signal sig1 and the second simulator control signal sig2.

Through this, the multi-radar target simulator 200 is capable of designing a test scenario without considering the target position, the number of targets, and the like, and is capable of generating random traffic.

The front radar sensor FLD may perform a function evaluation on the detection operation for the multi-radar target simulated by the multi-radar target simulator 200.

Figure 7:
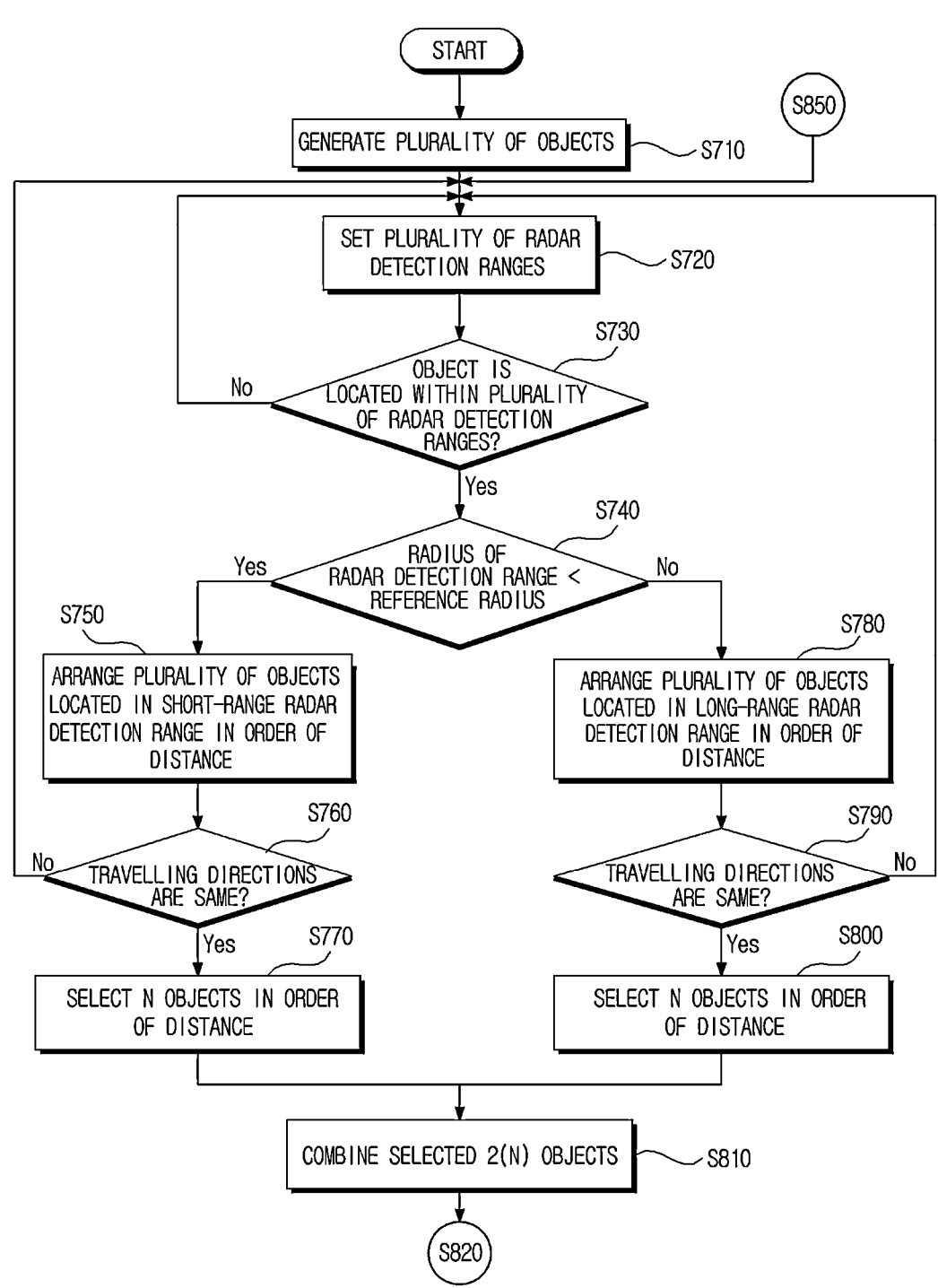
FIG. 7 is a first diagram of a method of generating target information for a multi-radar target simulator according to an embodiment of the present disclosure.
Figure 8:
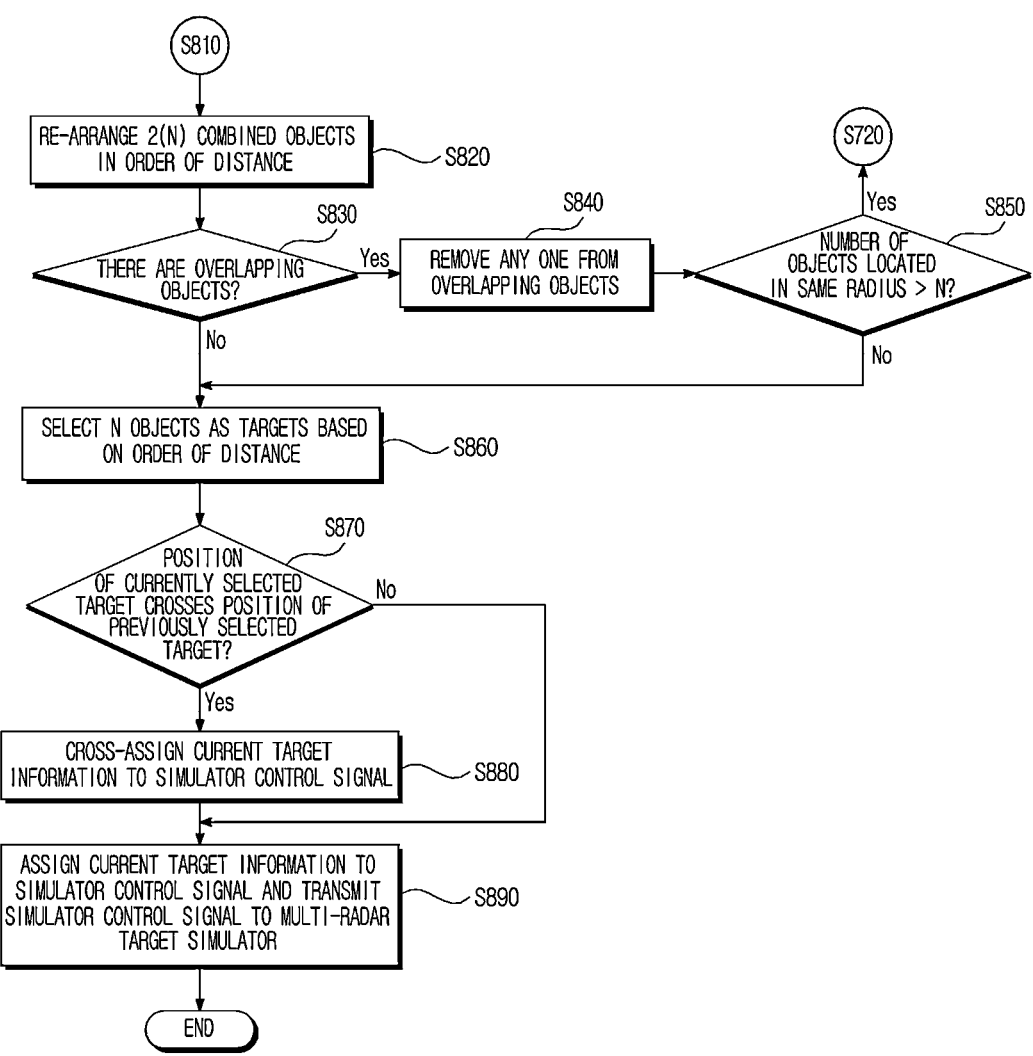
FIG. 8 is a second diagram of a method of generating target information for a multi-radar target simulator according to an embodiment of the present disclosure.

FIG. 7 is a first diagram of a method of generating target information for a multi-radar target simulator according to an embodiment of the present disclosure. FIG. 8 is a second diagram of a method of generating target information for a multi-radar target simulator according to an embodiment of the present disclosure.

Referring to FIGS. 1, 7, and 8, the method of generating target information for the multi-radar target simulator may include an object generating operation S710 to a target information generating operation S890.

In the object generating operation S710, the modelling unit 110 virtually generates a plurality of objects. Herein, the plurality of objects may be a vehicle of which a position and a speed vary according to a time flow.

In a detection range setting operation S720, the modelling unit 110 sets a plurality of radar detection ranges. The modelling unit 110 may receive the plurality of radar detection ranges from a front radar sensor that is a target of a function evaluation. The plurality of radar detection ranges may include a short-range radar detection range of a short-range radar sensor and a long-range radar detection range of a long-range radar sensor.

In an object position determining operation S730, the object arranging unit 120 determines whether at least two objects are located within the plurality of radar detection ranges. When at least two objects are not located within the plurality of radar detection ranges, the position of the plurality of objects may be reset by the modelling unit 110.

In a detection range selection operation S740, when at least two objects are located within the plurality of radar detection ranges (Yes in S730), the object arranging unit 120 determines whether there is a radar detection range that is less than a predetermined reference radius among the plurality of radar detection ranges. The reference radius may be set according to the user's needs.

In a first arrangement operation S750, when there is a radar detection range that is less than a predetermined reference radius among the plurality of radar detection ranges (Yes in S740), the object arranging unit 120 may arrange the plurality of objects located in the short-range radar detection range that is less than the reference radius in an order close to the front radar sensor.

In a first travelling direction determining operation S760, the object arranging unit 120 determines whether a travelling direction of the plurality of objects is the same as a travelling direction of the vehicle mounted with the front radar sensor. When the travelling direction of the plurality of objects is not the same as the travelling direction of the vehicle mounted with the front radar sensor (No in S760), the travelling direction of the plurality of objects may be changed by the modelling unit 110.

In a first object selecting operation S770, when the travelling direction of the plurality of objects is the same as the travelling direction of the vehicle mounted with the front radar sensor (Yes in S760), the object arranging unit 120 selects N objects based on an order close to the front radar sensor. Herein, N may be 2, but is not limited thereto.

In the meantime, in a second arrangement operation S780, when there is a radar detection range that is equal to or larger than a predetermined reference radius among the plurality of radar detection ranges (No in S740), the object arranging unit 120 arranges the plurality of objects located in the long-range radar detection range that is equal to or larger than the reference radius in the order close to the front radar sensor.

In a second travelling direction determining operation S790, the object arranging unit 120 determines whether the travelling direction of the plurality of objects is the same as the travelling direction of the vehicle mounted with the front radar sensor. When the travelling direction of the plurality of objects is not the same as the travelling direction of the vehicle mounted with the front radar sensor (No in S790), the traveling direction of the plurality of objects may be changed by the modelling unit 110.

In a second object selecting operation S800, when the travelling direction of the plurality of objects is the same as the travelling direction of the vehicle mounted with the front radar sensor (Yes in S790), the object arranging unit 120 selects N objects based on an order close to the front radar sensor. Herein, N may be 2, but is not limited thereto.

In a combining operation S810, the object arranging unit 120 combines the 2(N) objects selected in the first object selecting operation S770 and the second object selecting operation S800.

In a re-arranging operation S820, the object arranging unit 120 re-arranges the 2(N) combined objects in the order close to the front radar sensor.

In an overlapping determining operation S830, the object arranging unit 120 determines whether there are overlapping objects among the re-arranged objects.

In a deleting operation S840, when there are overlapping objects among the rearranged objects (Yes in S830), the object arranging unit 120 removes any one among the overlapping objects.

In a same radius determining operation S850, the object arranging unit 120 determines whether there are objects located in the same radius after the overlapping object is removed. When there are the objects located in the same radius (Yes in S850), the location information of the plurality of objects may be reset by the modelling unit 110.

In a target selecting operation S860, when there are no overlapping objects among the re-arranged objects (No in S830), the object arranging unit 120 selects N objects as targets based on the order close to the front radar sensor among the plurality of rearranged objects. Herein, when the target is selected by the object arranging unit 120, the simulator control unit 130 may assign the selected target information to a simulator control signal.

In a crossing determining operation S870, the simulator control unit 130 compares the target information previously assigned to the simulator control signal and the currently selected target information and determines whether the target information previously assigned to the simulator control signal crosses the currently selected target information.

In a crossing assigning operation S880, when it is determined that the target information previously assigned to the simulator control signal crosses the currently selected target information in the crossing determining operation S870 (Yes in S870), the simulator control unit 130 cross-assigns the current target information to the simulator control signal.

In a transmitting operation S890, when it is not determined that the target information previously assigned to the simulator control signal crosses the currently selected target information in the crossing determining operation S870 (No in S870), the simulator control unit 130 assigns the current target information to the simulator control signal in order. Further, the simulator control unit 130 transmits the simulator control signal to which the current target information is cross-assigned or is assigned in order to the multi-radar target simulator 200. Through this, the multi-radar target simulator 200 may simulate the multi-radar target according to the simulator control signal.

Although the embodiment of the present disclosure has been described for illustrative purposes, those having ordinary skill in the art should appreciate that various modifications, additions and substitutions are possible, without departing from the essential characteristic of the present disclosure. Therefore, the embodiments disclosed in the present disclosure and the accompanying drawings are not intended to limit the technical spirit of the present disclosure. The embodiments disclosed in the present disclosure and the accompanying drawings are intended to illustrate the scope of the technical idea of the present disclosure, and the scope of the present disclosure is not limited by the embodiment and the accompanying drawings.

The steps and/or operations according to the present disclosure may occur in different orders, or in parallel, or simultaneously in different embodiments for different epochs and the like as may be appreciated by those having ordinary skill in the art.

Depending on the embodiment, a part or the entirety of the steps and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "unit," and "module" discussed in the present specification may be implemented by software, firmware, hardware, and/or any combination thereof.

Meanwhile, the embodiments according to the present disclosure may be implemented in the form of program instructions that can be executed by computers and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

As described above, the embodiments have been described and illustrated in the drawings and the specification. The embodiments have been chosen and described in order to explain certain principles of the present disclosure and their practical application and thus enable those having ordinary skill in the art to make and utilize various embodiments of the present disclosure, as well as various alternatives and modifications thereof. As is evident from the foregoing description, certain aspects of the present disclosure are not limited by the particular details of the examples illustrated herein. It is therefore contemplated that other modifications and applications, or equivalents thereof, may occur to those having ordinary skill in the art. Many changes, modifications, variations and other uses and applications of the present construction should, however, become apparent to those having ordinary skill in the art after considering the specification and the accompanying drawings. All such changes, modifications, variations and other uses and applications, which do not depart from the spirit and scope of the present disclosure are deemed to be covered by the present disclosure, which is limited only by the following claims.

What is claimed is:

1. A system for generating target information for a multi-radar target simulator, the system comprising:
a modelling unit configured to generate a plurality of virtual objects so as to be located within a plurality of radar detection ranges of a front radar sensor;
an object arranging unit configured to arrange the plurality of virtual objects located in each of the plurality of radar detection ranges in a distance order and select at least two virtual objects among the plurality of arranged virtual objects based on an order close to the front radar sensor; and
a simulator control unit configured to select at least two virtual objects as targets from the at least two virtual objects selected by the object arranging unit and control a multi-radar target simulator by using information about the at least two selected targets,
wherein the object arranging unit is further configured to select the at least two virtual objects based on whether a traveling direction of virtual objects, among the plurality of virtual objects, is the same as a traveling direction of a vehicle equipped with the front radar sensor.

2. The system of claim 1, wherein the plurality of radar detection ranges includes a short-range radar detection range and a long-range radar detection range.

3. The system of claim 2, wherein the object arranging unit is further configured to arrange the plurality of virtual objects located in the short-range radar detection range in an order of distance and select at least two virtual objects among the arranged virtual objects based on an order close to the front radar sensor,
wherein the object arranging unit is further configured to arrange the plurality of virtual objects located in the long-range radar detection range in the order of distance and select at least two virtual objects among the arranged virtual objects based on an order close to the front radar sensor, and
wherein the object arranging unit is further configured to combine the selected virtual objects in the short-range radar detection range or the long-range radar detection range and re-arrange the combined virtual objects in the order of distance.

4. The system of claim 2, wherein the object arranging unit is further configured to combine the selected virtual objects in the short-range radar detection range or the long-range radar detection range and re-arrange the combined virtual objects in the order of distance.

5. The system of claim 4, wherein when there are overlapping objects among the re-arranged virtual objects, the object arranging unit removes an overlapping virtual object among the overlapping virtual objects.

6. The system of claim 4, wherein the object arranging unit is configured to select at least two virtual objects among the re-arranged virtual objects based on the order close to the front radar sensor.

7. The system of claim 1, wherein the simulator control unit is further configured to assign target information at a location closest to the front radar sensor among the at least two target information to a first simulator control signal and assign the remaining target information to a second simulator control signal.

8. The system of claim 7, wherein the simulator control unit is further configured to compare previous target information and current target information of each target respectively assigned to the first simulator control signal and the second simulator control signal, and
when a relative positional order of the target information assigned to the first simulator control signal and the second simulator control signal crosses, the simulator control unit maintains a previous assignment by cross-assigning the current target information to the simulator control signal identically to the previous target information.

* * * * *